United States Patent
Oakes et al.

(10) Patent No.: US 7,564,355 B2
(45) Date of Patent: Jul. 21, 2009

(54) ADAPTIVELY TRANSMITTING A SIGNAL FOR ACTIVATING A TAG

(75) Inventors: Jeffrey T. Oakes, Boca Raton, FL (US); Thomas J. Frederick, Chapel Hill, NC (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 178 days.

(21) Appl. No.: 11/370,591

(22) Filed: Mar. 7, 2006

(65) Prior Publication Data

US 2006/0220792 A1    Oct. 5, 2006

Related U.S. Application Data

(60) Provisional application No. 60/659,244, filed on Mar. 7, 2005.

(51) Int. Cl.
*G08B 13/14* (2006.01)
*H04Q 5/22* (2006.01)
(52) U.S. Cl. .................. 340/572.1; 340/10.4; 340/10.5
(58) Field of Classification Search ... 340/568.1–572.9, 340/10.1–10.6; 455/67.13, 69
See application file for complete search history.

(56) References Cited

U.S. PATENT DOCUMENTS

| 4,160,209 | A | * | 7/1979 | Thompson ................... 375/295 |
| 5,353,010 | A | | 10/1994 | Sanetra et al. |
| 5,729,202 | A | | 3/1998 | Klaehn et al. |
| 6,002,427 | A | * | 12/1999 | Kipust ......................... 348/156 |
| 6,249,229 | B1 | * | 6/2001 | Eckstein et al. ........... 340/572.4 |
| 6,559,754 | B1 | * | 5/2003 | Amtmann ................ 340/10.51 |
| 6,696,951 | B2 | * | 2/2004 | Belka et al. ............... 340/572.1 |
| 7,271,715 | B2 | * | 9/2007 | Aupperle et al. ........ 340/539.13 |
| 7,292,825 | B2 | * | 11/2007 | Beale et al. ............... 455/67.11 |
| 2007/0024444 | A1 | * | 2/2007 | Fukuda ..................... 340/572.1 |

FOREIGN PATENT DOCUMENTS

| WO | WO 97/45819 A | 12/1997 |
| WO | WO 00/52656 A | 9/2000 |

OTHER PUBLICATIONS

EPO International Search Report and Written Opinion dated Aug. 17, 2006 for corresponding appln PCT/US2006/008294.

* cited by examiner

*Primary Examiner*—Jennifer Mehmood

(57) ABSTRACT

Adaptive transmission of a tag activation signal and detection of a tag. By monitoring the effects of a load on a tag activation signal, a signal analyzer adjusts the transmission waveform from which the signal is generated so that the next tag activation signal transmitted into the load more closely corresponds to a desired activation signal.

29 Claims, 5 Drawing Sheets

US 7,564,355 B2

ADAPTIVELY TRANSMITTING A SIGNAL FOR ACTIVATING A TAG

CROSS REFERENCE TO RELATED APPLICATIONS

The present application relates to and claims priority from U.S. Provisional Patent Application No. 60/659,244, filed Mar. 7, 2005, entitled "EAS Transmitter Controller with Adaptive Controller Parameters," the entire disclosure of which is hereby incorporated by reference herein.

FIELD OF THE INVENTION

The present invention generally relates to transmitting a signal for activating a tag. More specifically, it relates to actively adjusting an activation signal broadcast by a tag detector for different loads presented to the detector's transmitter to improve the accuracy of recognizing a tag, such as an anti-shoplifting tag, within a set range of the tag detector.

BACKGROUND OF THE INVENTION

Many systems transmit a signal for activating a tag. One such system is an electronic article surveillance (EAS) system. In an EAS system, tags are affixed to inventory items, and EAS detector units (i.e. tag readers) produce an alarm signal when they detect the presence of a tag within their range. EAS detector units are commonly placed near the entrances and exits to stores or factories and provide alarm signals when tagged inventory items get within range of the units. An EAS alarm alerts the appropriate personnel so that they can determine any necessary action. The tags used in this application can be deactivated by store personnel, for example, with the appropriate equipment so that the items with the affixed tags can leave the building without an EAS detector unit sensing the tag and providing the alarm signal.

Typical EAS detector units periodically and repeatedly transmit an activation signal of a particular frequency, duration, and duty cycle to excite a tag for detection. An EAS detector unit has a transmitter for transmitting the activation signal and a detection circuit for detecting the presence of a tag within a range of the detector unit. The type of load presented to the transmitter and the fairly high voltage and current levels of the transmitter make a pulse width modulated (PWM) type of transmitter economical. Recent transmitter designs, which are controlled by software, use a proportional, integral, and derivative (PID) controller to determine how the transmitter operates. The PID parameters of the controller may be set so that the transmitter waveform has a proper risetime and minimal overshoot, and that the amplitude be well regulated. The range within which a detector unit will detect a tag is determined by the current amplitude (i.e., current level of the transmitter) and various other factors including receiver characteristics, tag parameters, and some environmental factors.

As store display items and people move around within the range of an EAS detector unit, the load presented to the transmitter changes. This affects the characteristics of the activation signal (e.g., risetime, overshoot, and regulation). An activation signal that varies from the desired waveform can cause the detector unit to falsely identify the presence of a tag within the range, or to not identify the presence of a tag that is within the range. This marginalizes the usefulness of the system in that it alerts personnel to a problem when there is not one, and does not alert personnel to a possible problem when there is one. Even though a transmitter current level is set upon installation of the EAS detector unit, the effective range is also subject to variance by the changing load conditions.

For each current level (e.g., range) and load, a different combination of PID parameters may be necessary to achieve the desired activation waveform.

Systems for transmitting a signal for activating a tag have utilized a look-up table in memory of the controller so that the controller can associate some PID parameter combination with some desired current level. The current level values are discrete and therefore so are the combinations of possible PID parameters in a given reader. Look-up tables are also designed so that the PID parameters are adequate with some but not all desired loads. The granularity of current values and PID parameters make this table a compromise point of transmitter performance.

Signals for activating tags include a wide variety of transmission signals. Some forms of transmission signals that may be used to activate tags include, for example, radio frequency, microwaves, electromagnetic, acoustomagnetic, inductive, and electrical.

A wide variety of systems may transmit a signal for activating a tag. Such systems include, for example, EAS systems, single bit radio frequency identification (RFID) systems (e.g., radio frequency, microwave, frequency divider, electromagnetic, and acoustomagnetic), and n bit (e.g., memory based), electronic or physical RFID systems (e.g., inductive coupled full or half duplex, electromagnetic backscatter full or half duplex, close coupling full or half duplex, electrical coupling full and half duplex, and sequential via inductive coupling or surface acoustic wave). Such systems include active and partially active RFID systems. In partially active RFID systems, the RFID reader periodically transmits an activation signal of a set frequency, duration, and duty cycle. The tag senses the activation signal and transmits data back in response during periods when the reader is not transmitting the activation signal. These systems may also suffer the same problems as EAS systems in that tags may not be properly activated if there is a poor activation signal, or the reader may not identify a tag sending data and either broadcast an activation signal while the tag is trying to transmit data to the reader or simply not detect the data because of an improperly configured detection unit.

SUMMARY OF THE INVENTION

Embodiments of the present invention overcome one or more deficiencies in known systems for transmitting a signal for activating a tag by permitting dynamic adjustments to transmission waveform parameters in activation signal transmitters to provide a more accurate tag activation signal. Advantageously, aspects of the invention increase tag detection when a tag is within range and reduce false detection of tags.

Further aspects of the invention permit dynamic adjustments to current amplitude or current levels of a reader transmitter to help maintain the effective range of the reader or change the range of the reader based on, for example, any of the time of day, the day of the week, the day of the month, or the day of the year. These adjustments affect power consumption of the unit such that they may also be used to conserve power during times when the system does not need to be active (e.g., when a store having an EAS system is closed).

An apparatus embodying aspects of the invention transmits a signal for activating a tag is provided. The apparatus includes a transmitter controller, a transmitter circuit, and a signal analysis device. The transmitter controller provides a transmission waveform. The transmitter circuit receives the transmission waveform and provides a corresponding transmission signal adapted to activate a tag. The signal analysis device receives the transmission signal, determines at least one variance characteristic of the transmission signal, and adjusts the transmitter controller in response to the at least one variance characteristic to improve the at least one variance characteristic.

Another aspect of the invention relates to a method of controlling a transmission signal for activating a tag. At least one variance characteristic of a transmission signal, which is adapted to activate a tag, is determined. A transmission waveform is adjusted based on the determined variance characteristic such that the variance characteristic is improved. An adjusted transmission signal is transmitted which corresponds to the adjusted transmission waveform.

In another aspect, a system for providing an alarm signal includes a transmitter controller, a transmitter circuit, one or more antennas, a plurality of tags, and a signal analysis device. The transmitter controller provides a transmission waveform and the transmitter circuit receives the transmission waveform and provides a transmission signal corresponding to the transmission waveform. The antenna broadcasts the transmission signal within a range and receives a detection signal from within the range. The tags receive the transmission signal broadcast by the antenna and provide corresponding detection signals. If none of the tags are within the range, then the detection signal is negative and if any of the tags are within the range, then the detection signal is positive. The signal analysis device receives the transmission signal and the detection signal and determines at least one variance characteristic of the transmission signal. The signal analysis device adjusts the transmitter controller in response to the determined at least one variance characteristic to improve the variance characteristic. The signal analysis device also determines whether the detection signal is positive or negative and provides a corresponding alarm signal.

Alternatively, the invention may comprise various other methods and apparatuses.

Other objects and features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION OF THE INVENTION

Aspects of the present invention relate to a system having a tag detector or reader (see FIG. 3) with a dynamically adjustable transmission signal. The tag reader monitors its transmission signal and makes adjustments so that the next transmission signal more closely corresponds to a desired tag activation signal. This compensates for changes in loads seen by the reader's transmitter and thus increases the accuracy with which the reader can identify the presence of a tag within a range of the reader and reduces the likelihood of falsely detecting the presence of a tag within the range. The following discussion explains dynamically adjusting tag reader transmission signals for an acoustomagnetic EAS system, but the discussion is applicable to other systems which transmit a signal into a load (e.g., partially active RFID systems, both magnetic and electrically coupled).

Figure 1:
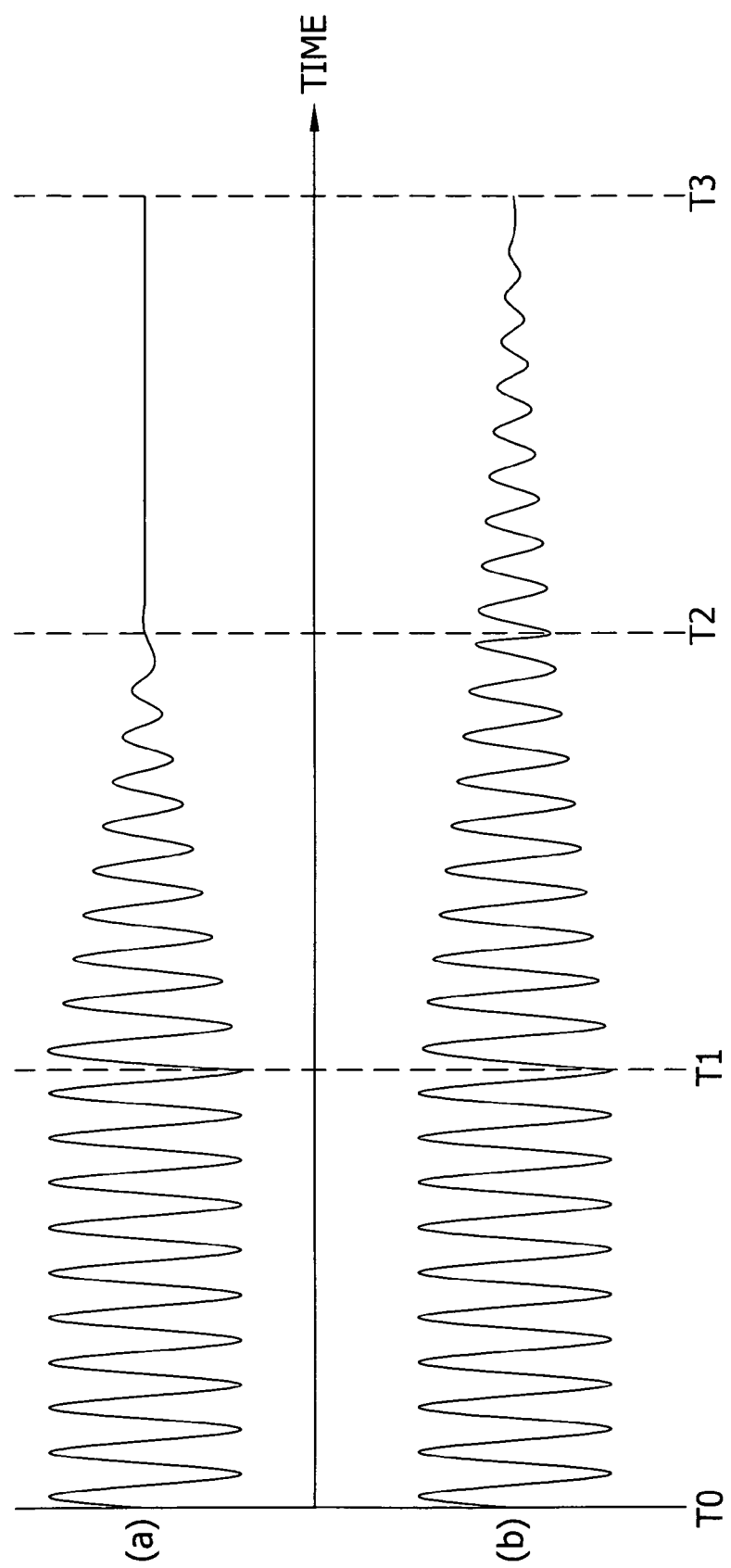
FIG. 1a is an illustration of a tag activation signal followed by a negative detection signal according to an embodiment of the invention.
FIG. 1b is an illustration of a tag activation signal followed by a positive detection signal according to an embodiment of the invention.

Referring now to FIG. 1, one embodiment of a transmission signal for activating a tag is shown along with detection signals. Waveform (a) shows a transmission signal followed by a negative detection signal, and waveform (b) shows a positive detection signal. This embodiment of the activation signal features a pulse width modulated (PWM) signal of a predetermined frequency, duty cycle, and duration. Characteristics of the desired activation signal are chosen to interact with tags that have particular specifications and may need to be changed to activate tags with other specifications. In the illustrated embodiment, a reader transmits the activation signal from time T0 to time T1. For example, the activation signal is substantially sinusoidal at the antenna of the reader. From time T1 to time T2, the sinusoidal waveform rings down. Waveform (a) and waveform (b) are the same from time T0 to time T1 because they both represent the activation signal transmitted by the reader. Waveform (a) and waveform (b) are similar from time T1 to time T2 because they are both ringing down from the activation signal. Waveform (a) is flat and level from time T2 to time T3, which corresponds to a negative detection signal meaning that there is no tag (of the appropriate series) within range of the reader. Waveform (b) after time T2 is generally sinusoidal and diminishing from time T1 to time T2, which corresponds to a positive detection signal meaning that there is a tag within range of the reader.

Figure 2:
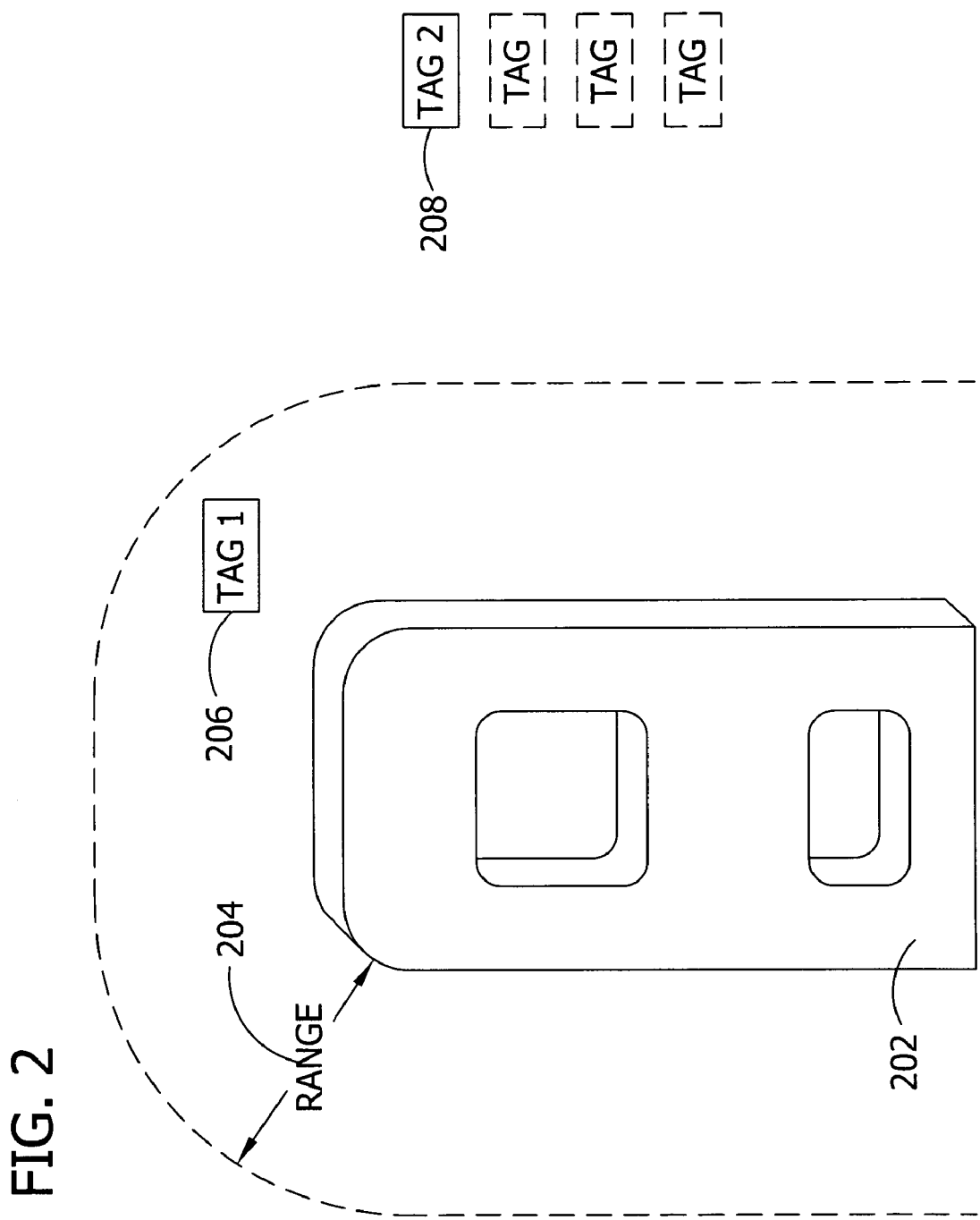
FIG. 2 is an illustration of an EAS system according to an embodiment of the invention.

Referring to FIG. 2, an embodiment of an EAS system using acoustomagnetic technology is shown. In this system, a reader 202 has a range 204 defined by the current level of the reader's transmitter and influenced by other factors including receiver characteristics, tag parameters and environmental factors (e.g., large metallic objects). The current level generally determines the amplitude of the transmitter's activation signal. Objects placed within the range 204 of the reader 202 cause the load presented to the reader to change. Those skilled in the art will recognize that the load includes, among other things, the reader's antenna and any tags or other objects within range of the reader. A change in the load causes changes to the transmission signal. The system embodying aspects of the invention dynamically adjusts a transmission waveform so that the actual transmission signal it monitors is closer to the ideal activation signal shown in FIG. 1(a) than the previous transmission signal. A first tag 206 is within the range 204 of the reader 202 such that the signal monitored by the reader is that of FIG. 1(b). If the first tag 206 was not within the range 204, and only tags outside the range 204 are present such as a second tag 208, then the signal monitored by the reader 202 is that of FIG. 1(a). The EAS system includes a plurality of tags (shown in phantom), each of which is attached to, for example, an inventory item. The reader 202 provides an alarm whenever a tag 206 is within the range 204 of the reader 202.

Figure 3:
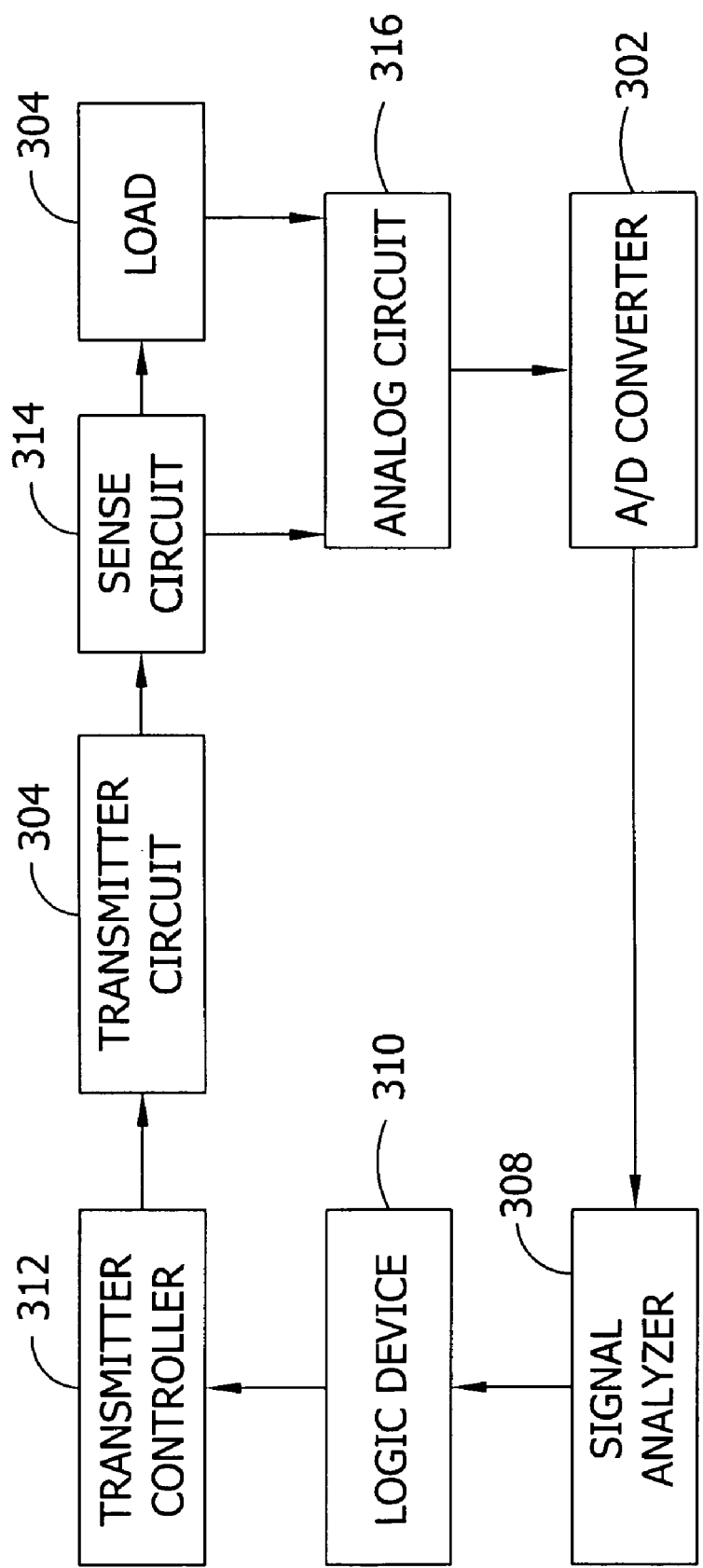
FIG. 3 is a block diagram illustrating a tag reader according to an embodiment of the invention.

Referring now to FIG. 3, one embodiment of a reader circuit for dynamically adjusting an activation signal is shown. An analog to digital (A/D) converter 302 receives a signal that is the composite of a detection signal and a transmission signal. The transmission signal is provided by a transmission circuit 304 and influenced by a load 304. The A/D converter 302 provides a digitized transmission signal which corresponds to the received composite signal to a signal analyzer 308. In one embodiment, the signal analyzer 308 constitutes a waveform analysis device for determining at least one variance characteristic of the digitized transmission signal. For example, the signal analyzer 308 checks the digitized transmission signal for oscillation. If the signal is oscillating (other than the oscillation corresponding to the desired tag activation signal (see FIG. 1 at time T0 to T1), then the analysis routine ends and the variance characteristic determined is that of oscillation. If oscillation is not determined, the signal analyzer 308 checks the digitized transmission signal for another variance characteristic, such as ringing. If it determines that the signal is ringing, then the only variance characteristic determined is ringing. The signal analyzer 308 then checks the signal for overshoot, lagging, poor regulation, and the like. The signal analyzer 308 looks at the portion of the digitized transmission signal corresponding to the detection signal to determine if a tag is within range of the apparatus. In this embodiment, if a tag is within range of the reader, a positive detection signal (see FIG. 1(b) at time T2 to time T3) is determined, or, if no tag is within range of the reader a negative detection signal (see FIG. 1(a) at time T2 to time T3) is determined. If a positive detection signal is determined, (i.e., a tag is within range), an alarm signal is provided. The signal analyzer 308 provides the detected variance characteristics to a logic device 310. In the embodiment of FIG. 3, the A/D converter 302 receives the composite detection and transmission signal as detected by a sense circuit 314 and buffered by an analog circuit 316.

Figure 5:
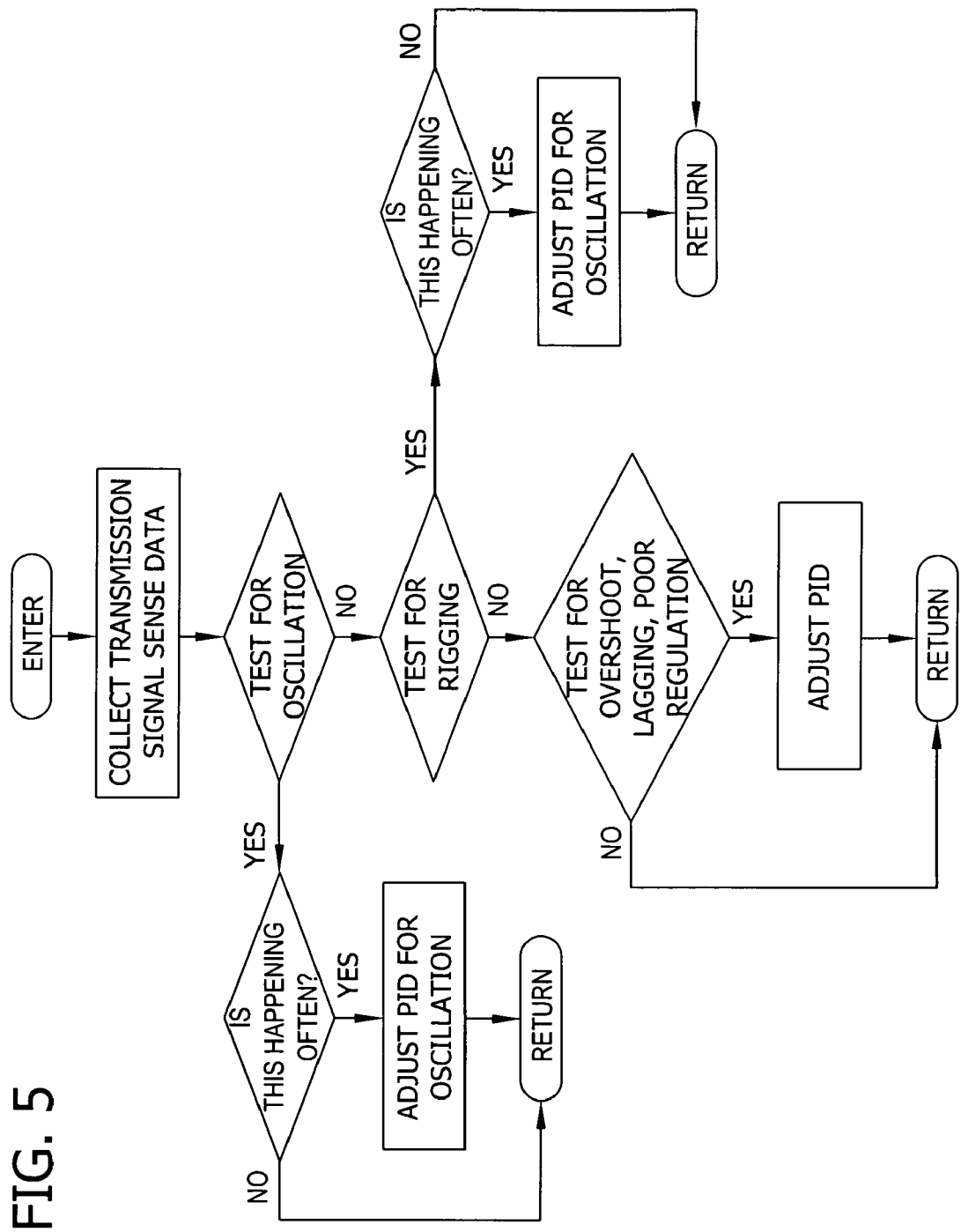
FIG. 5 illustrate an exemplary flow diagram according to one embodiment of signal analysis operations performed by the tag reader of FIG. 3.

The logic device 310 examines the variance characteristics and determines changes to be made to the transmission signal so that future transmission signals will more closely correspond to the desired activation signal. In one embodiment, the logic device 310 is a fuzzy logic device which determines the degree of necessary changes to the transmission signal. In one embodiment, the logic device determines proportional, integral, and derivative (PID) parameters that influence the transmission signal. The PID parameters are passed to a transmitter controller 312 which provides a transmission waveform corresponding to the provided PID parameters. FIG. 5 illustrates exemplary operations performed by signal analyzer 308 and logic device 310.

The transmitter circuit 304 receives the transmission waveform having an embedded current level or amplitude and provides a corresponding adjusted transmission signal. The embedded current level generally controls the reader's range and the shape of the transmission waveform controls the correlation of the adjusted transmission signal to the desired tag activation signal. The transmitter circuit 304 uses this information (e.g., transmission waveform shape and amplitude) to transmit an adjusted transmission signal into the load 304 through the sense circuit 314, and the process of compensating for the effects of the load 304 on the transmission signal begins again when the A/D converter 302 receives the next composite signal including this adjusted transmission signal from the analog circuit 316.

In the embodiment shown in FIG. 3, the transmitter controller 312 is a PID controller. However, other controller types can be used. The logic circuit 310 and transmitter controller 312 may use any waveform definition scheme between themselves. It should also be noted that some or all of the components shown can be combined into a single device and need not be discrete components. Components may be implemented in hardware (e.g., microchips) or software. It is also important to note that although the embodiment of FIG. 3 defines the current level being embedded in the transmission waveform, it may be directly input to the transmitter circuit 302 as a gain factor or at any other component in the apparatus. The logic device 310 may also determine changes to the current level in order to maintain a consistent range despite a changing load 306. Objects moving in and out of the range of the apparatus may affect the load seen by the transmitter circuit 302 and cause the effective range to change, and the logic device 310 may be used to adjust for these variances to maintain a consistent range. The current level may also be adjusted according to any or all of the time of day, day of the week, day of the month, and day of the year, or adjusted based on other factors. The current level may be adjusted for days or times of day known to have more people passing by the apparatus (e.g. peak shopping times in a retail store) which will affect the load 306 seen by the transmitter circuit 302 and possibly the effective range of the system. The current level may also be decreased when the system is not needed (e.g., the retail store employing an EAS system is closed) in order to conserve power.

Figure 4:
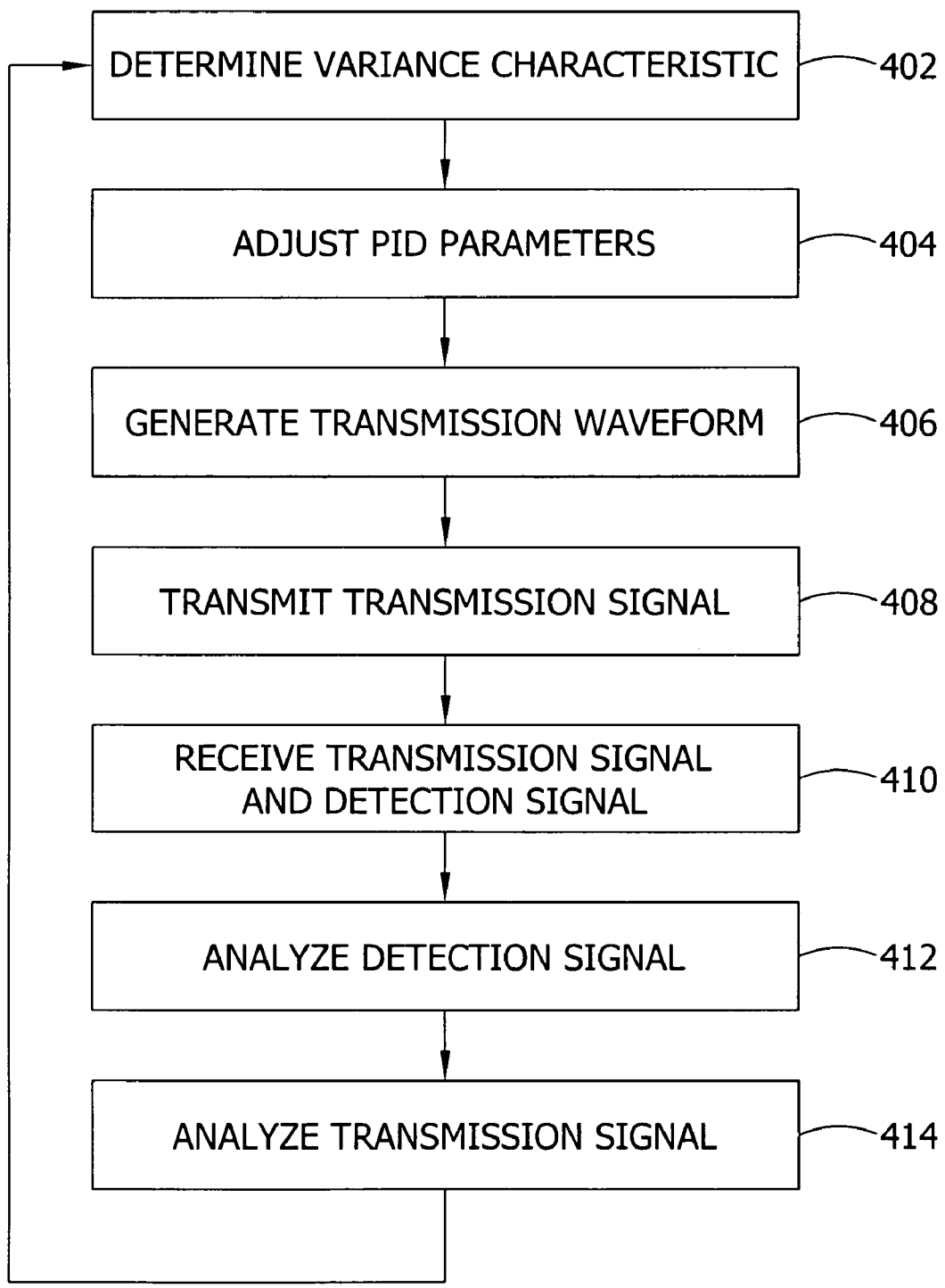
FIG. 4 is an exemplary flow diagram illustrating a method for dynamically adjusting a reader transmission signal and detecting tags according to an embodiment of the invention.

Referring now to FIG. 4, a method of adjusting a transmission signal for activating a tag and detecting a tag is shown according to one embodiment of the invention. At step 402, a variance characteristic of a transmission signal is determined. The determined variance characteristic is indicative of needed adjustments. At step 404, adjustments are made to PID parameters. A transmission waveform is generated at step 406 which corresponds to the adjusted PID parameters. The transmission waveform is used to provide a corresponding transmission signal which is transmitted within a range into a load at step 408. At step 410, the transmitted transmission signal as affected by the load and a detection signal from within the range are received. The detection signal is analyzed at step 412 to determine whether it is positive, indicating a tag within the range, or negative, indicating that no tag is within the range. The transmitted transmission signal is analyzed at step 414. The method may be repeated by determining a variance for the transmitted transmission signal at step 402.

Referring now to FIG. 5, an exemplary flow diagram illustrates aspects of signal analysis and control performed by the reader of FIG. 3 in operation. In this embodiment of a variance characteristic determination scheme, the signal analyzer 308 checks the digitized transmission signal for oscillation. If the signal is frequently oscillating (other than the oscillation corresponding to the desired tag activation signal, see FIG. 1 at time T0 to T1), then the analysis routine ends and the variance characteristic determined is that of oscillation. If oscillation is not determined, the signal analyzer 308 checks the digitized transmission signal for another variance characteristic, such as ringing. If it determines that the signal is ringing, then the only variance characteristic determined is ringing. The signal analyzer 308 then checks the signal for overshoot, lagging, poor regulation, and the like. The determined variance characteristic or characteristics are passed to the logic device 310 which makes appropriate adjustments to parameters which define the transmission waveform. One skilled in the art will recognize that the above variance characteristics may be reprioritized or reordered, or that different variance characteristics may be used.

Having described the invention in detail, it will be apparent that modifications and variations are possible without departing from the scope of the invention defined in the appended claims.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the various embodiments of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. An apparatus for transmitting a signal for activating a tag comprising:
   a transmitter for transmitting a transmission signal in the form of a transmission burst adapted to activate a tag to enable detection thereof;
   a transmitter controller for providing a transmission waveform, said transmission waveform having a frequency, duty cycle and duration determined for optimal activation and detection of the tag;
   a receiver for detecting and identifying a responsive signal transmitted by the tag activated by said transmission burst, said receiver including:
   a signal analysis device for:
      receiving the transmission signal;
      analyzing the transmission signal to determine effects of a load as compared with a reference signal; and
      adjusting the transmitter controller to compensate for the effects of the load on the transmission signal by generating instructions to send an adjusted transmission signal corresponding to the reference signal.

2. The apparatus of claim 1 wherein the signal analysis device further comprises:
   an analog to digital converter for receiving the transmission signal and providing a digitized transmission signal representative of the received transmission signal;
   a waveform analysis device for receiving the digitized transmission signal and determining at least one variance characteristic of said digitized transmission signal as compared with the reference signal; and
   a logic device for receiving the determined variance characteristic of the digitized transmission signal and adjusting the transmitter controller in response to the determined variance characteristic.

3. The apparatus of claim 1 wherein adjusting the transmitter controller comprises adjusting at least one variance characteristic that the transmitter controller uses to determine the adjusted transmission signal.

4. The apparatus of claim 2, wherein if a variance characteristic of ringing is determined, the signal analysis device is configured to not determine any other variance characteristics.

5. The apparatus of claim 2, wherein if a variance characteristic of oscillation is determined, the signal analysis device is configured to not determine any other variance characteristics.

6. The apparatus of claim 2, wherein the at least one variance characteristic is improved for subsequent tag activation signals.

7. The apparatus of claim 1 wherein the transmission signal is broadcast within a range, said range being at least partially determined by a current level supplied to the transmitter.

8. The apparatus of claim 7 wherein the current level is adjusted as a function of a schedule, said schedule being based on at least one of a time of day, a day of a week, a day of a month, and a day of a year.

9. The apparatus of claim 1 wherein the transmission signal is repeating, and of a set frequency, duration, and duty cycle.

10. A method of controlling a transmission signal for energizing an EAS tag for detection thereof:
    sending a transmission to a receiver accordance with a waveform having a frequency, duty cycle and duration determined for optimal activation and detection of the tag, wherein said transmission signal will cause the tag to mechanically resonate at a predetermined frequency upon exposure to the transmission signal;
    and the receiver receiving the transmission signal and analyzing the transmission signal to determine the effects of a load as compared with a reference signal; and
    compensating for the effects of the load on the transmission signal by generating instructions to send an adjusted transmission signal corresponding to the reference signal.

11. The method of claim 10 wherein adjusting a transmission signal comprises:
    receiving a determined variance characteristic of the transmission signal; and
    adjusting parameters used to determine the adjusted transmission signal in response to the determined at least one variance characteristic.

12. The method of claim 10, wherein analyzing the transmission signal further comprises:
    responsive to determining that the transmission signal is oscillating, only determining an oscillation variance characteristic of the transmission signal.

13. The method of claim 10 further comprising adjusting the transmission signal by adjusting proportional, integral, and derivative parameters that are used to determine the adjusted transmission signal.

14. The method of claim 10, wherein the at least one variance characteristic is improved for subsequent tag activation signals.

15. The method of claim 10, wherein the adjusted transmission signal is broadcast within a range, said range being determined by a current level used in sending the transmission signal.

16. The method of claim 15, wherein the current level is adjusted as a function of a schedule, said schedule being based on at least one of a time of day, a day of a week, a day of a month, and a day of a year.

17. The method of claim 10, wherein the transmission signal is periodic, repeating, and of a set frequency, duration, and duty cycle.

18. A system for providing an alarm signal by dynamically adjusting an EAS interrogation signal for optimum tag response in varying load conditions, comprising:
- a transmitter controller for providing a transmission waveform;
- a transceiver for receiving the transmission waveform and providing a transmission signal corresponding to said transmission waveform;
- an antenna for broadcasting the transmission signal within a range and for receiving a detection signal emitted from a tag energized by the transmission signal from within the range;
- a plurality of tags for receiving the broadcast transmission signal and providing the corresponding detection signal to the antenna, wherein said detection signal is positive if any of the plurality of tags is within the range and negative if none of the plurality of tags are within the range;
- a signal analysis device for:
  - receiving the transmission signal,
  - receiving the detection signal,
  - analyzing the transmission signal to determine effects of a load as compared with an ideal activation signal; and
  - adjusting the transmitter controller to compensate for the effects of the load on the transmission signal by sending instructions to the transmitter controller to send an adjusted transmission signal corresponding to the ideal transmission signal.

19. The system of claim 18, wherein the signal analysis device further comprises:
- an analog to digital converter for receiving the transmission signal and the detection signal and providing a digitized transmission signal representative of a received transmission;
- a waveform analysis device for receiving the digitized transmission signal and determining at least one variance characteristic of said digitized transmission signal as compared with the ideal activation signal; and
- a logic device for receiving the at least one variance characteristic of the digitized transmission signal and adjusting at least one parameter in a set of parameters used by the transmitter controller to determine the transmission waveform in response to the determined variance characteristic.

20. The system of claim 18, wherein said signal analysis device is configured to provide the alarm signal when the detection signal received by the antenna is determined to be positive.

21. The system of claim 18, wherein adjusting the transmitter controller comprises adjusting proportional, integral, and derivative parameters that are used to determine the transmission waveform.

22. The system of claim 18, wherein the at least one variance characteristic is improved for RFID tag activation signals.

23. The system of claim 18, wherein said range is determined by a current level supplied to the transceiver.

24. The system of claim 23, wherein the current level is adjusted as a function of a schedule, said schedule being based on at least one of a time of day, a day of a week, a day of a month, and a day of a year.

25. The system of claim 18, wherein the transmission signal is periodic, repeating, and of a set frequency, duration, and duty cycle.

26. The method of claim 10 wherein analyzing the transmission signal further comprises:
responsive to determining that the transmission signal is ringing, only determining a ringing variance characteristic of the transmission signal.

27. The method of claim 10, wherein analyzing the transmission signal further comprises determining that the transmission signal is inadequately regulated.

28. The apparatus of claim 2, wherein the analog to digital converter receives a composite of a detection signal and the transmission signal.

29. The apparatus of claim 1 wherein the transmission signal is sent intermittently and the receiver detects and identifies responsive signals transmitted by the tag between transmissions.

* * * * *